E. L. UPSON & F. J. DOLE.
CONDUIT ROD OR COUPLING THEREFOR.
APPLICATION FILED SEPT. 11, 1908.
967,862.
Patented Aug. 16, 1910.
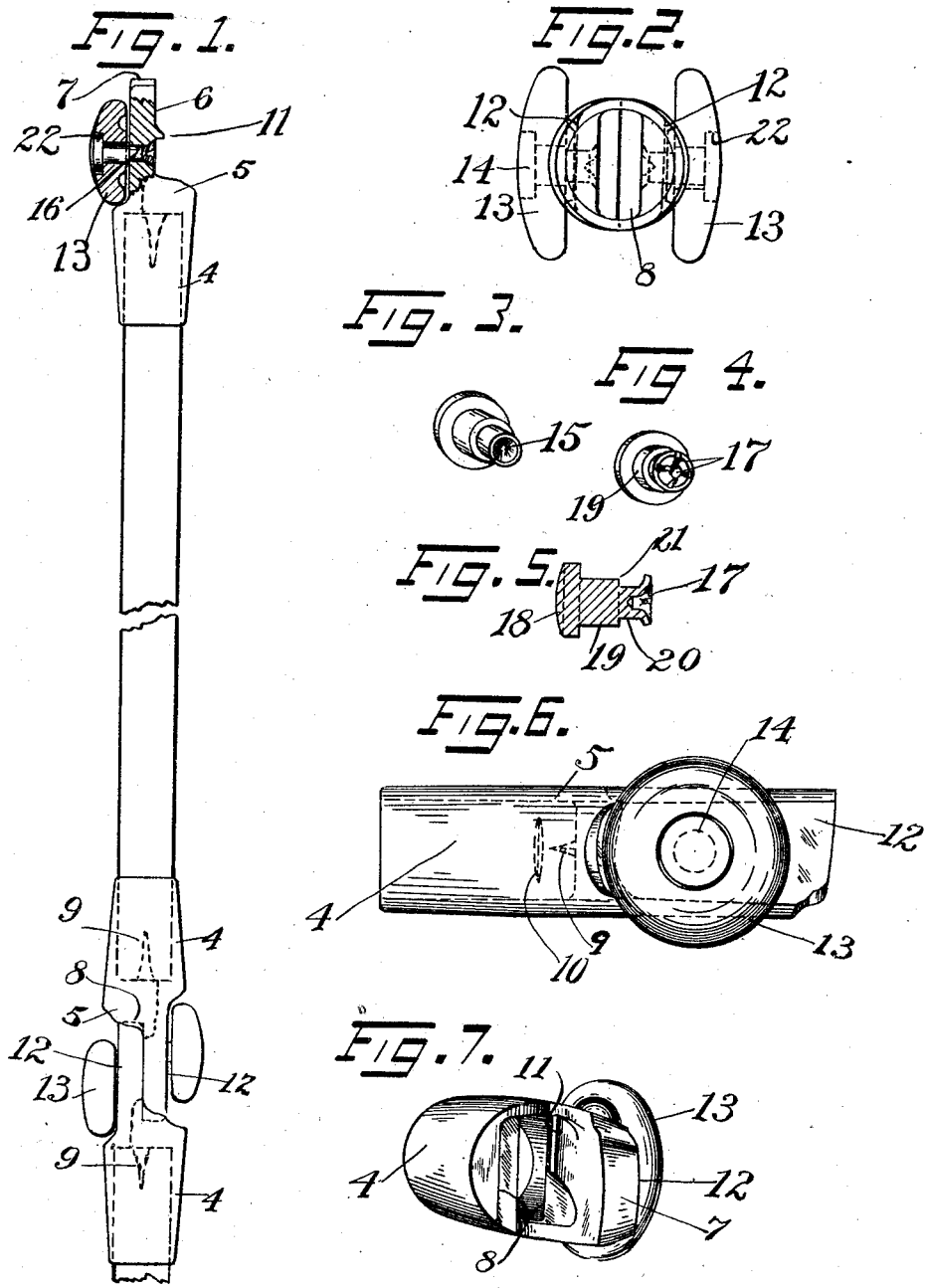
Witnesses:
H. O. Penney
C. C. Fuos
Inventors:
E. L. Upson & F. J. Dole,
By their Attorney,
F. W. Richards
THE NORRIS PETERS CO., WASHINGTON, D. C.

UNITED STATES PATENT OFFICE.

EDWIN L. UPSON AND FREDERICK J. DOLE, OF NEW YORK, N. Y., ASSIGNORS TO DIAMOND EXPANSION BOLT COMPANY, A CORPORATION OF NEW YORK.

CONDUIT-ROD OR COUPLING THEREFOR.

967,862.      Specification of Letters Patent.      Patented Aug. 16, 1910.

Application filed September 11, 1908. Serial No. 452,644.

*To all whom it may concern:*

Be it known that we, EDWIN L. UPSON and FREDERICK J. DOLE, citizens of the United States, residing at New York, in the county of Kings and State of New York, have invented certain new and useful Improvements in Conduit-Rods or Couplings Therefor, of which the following is a specification.

This invention relates to conduit rods or couplings therefor, the object of the invention being to provide an improved coupling rod for use in carrying wires through conduits and is an improvement in part upon the construction shown in our prior application, Serial No. 351,799, filed January 11, 1907, now U. S. Patent No. 911,854, patented February 9, 1909, the present improvement consisting in providing the duplicate coupling members for the coupling rods with wheels to facilitate the travel of such rods through the conduit, and in the particular manner of connecting the wheels with the coupling members.

Heretofore it has been the practice when wheels were used, to connect both wheels to one member of the coupling, as the male or female member thereof.

In the present improvement one wheel is connected to each coupling member, whereby they are generally slightly staggered, the wheels being connected in such a way that they may be readily attached to the coupling members at comparatively little expense.

In the drawings accompanying and forming part of this specification, Figure 1 is a view of a pair of coupling rods coupled together, a part of the coupling being shown in section; Fig. 2 is an enlarged end view of one of the coupling members; Figs. 3, 4 and 5 are detail views, the last in section, of the pivot or pin for connecting the wheel to the coupling; Fig. 6 is a side view of one of the coupling members; and Fig. 7 is a perspective view of one end of one of the coupling members.

Similar characters of reference indicate corresponding parts throughout the different figures of the drawings.

The coupling rods, usually composed of wooden rods or sticks, have each end provided with a coupling member 4, which members are duplicates of each other. The form of coupling member is that shown and described in our contemporaneously pending application, now Patent 911,854, hereinbefore referred to; but, briefly, it consists of a socket or sleeve portion 5 cut away at one side thereof, as at 6, which cut away portion terminates at its outer end in a rib 7 for engagement with a groove 8 in the companion coupling member, which groove opens into the sleeve portion of the coupling member, whereby a wedge 9 can be inserted into the stick or rod after the same has been inserted into its socket to spread the same into engagement with suitable projections 10 on the inner walls of the sleeve. Between the rib and the groove is located an upwardly projecting stop or lug 11. When a pair of members are coupled the engaging faces of the duplicate lugs coöperate and act as a pivot to enable the coupling members to be swung into proper coupling position and also to prevent longitudinal separation of the coupling members except by swinging the same to a position in which one of the coupling members will be substantially at an angle of about 90 degrees to the other.

The cut away portion of each coupling member has its outer side preferably slabbed off, as at 12, and formed flat, whereby the wheel will not project to any considerable extent beyond the peripheral surface of the sleeve. Each wheel 13, which is preferably of convex formation, is connected to the slabbed off side by means of a pin or stud 14, preferably of brass and usually though not necessarily made up of different diameters. This pin is counter-bored and counter-sunk at its inner end, as at 15, and when inserted into an opening 16 provided therefor in the slabbed off portion of the coupling member this counter-sunk portion will enable the same to be upset, as at 17. This manner of connecting the wheel to the sleeve thus furnishes a comparatively inexpensive as well as a quick method of attaching the wheel to the socket or sleeve. The stud, as hereinbefore stated, is preferably formed of different diameters, it having a head 18, a wheel carrying portion 19, and a portion 20 for insertion into the wall of the coupling member. The position of the pin in the coupling member is determined by means of a shoulder 21, the head of said pin preferably fitting into a counter-sunk opening 22 of the wheel, whereby the outer surface of such head is flush with the outer surface of the wheel and conforms in contour thereto.

By providing duplicate socket members we are enabled to couple rods either end first, and the provision of this form of rod enables wheels to be used one connected to each coupling member instead of two to a single coupling member, as for instance the male or female member, as heretofore. In other words by using our duplicate sockets provided with wheels, it is not necessary to mate or match the coupling rods. On the contrary either end of the rod may be handed, for instance, to the man in the pit for him to connect to the preceding coupling rod, thereby saving labor and time.

By arranging the wheels on the coupling rods so that when two of the wheels are brought together to form a pair and having them slightly staggered, or one in advance of the other, the coupling rod can easily pass over obstructions or ridges in the conduit, for the different wheels of a pair will pass over the obstruction successively, or one at a time. This action of the wheels is somewhat similar to "stepping over" the obstruction. While this is the preferred construction, our invention, of course, is not to be limited to this arrangement of the wheels.

It will be noted that the wheels are of such a shape that they will conform to the curvature of the pipe or conduit in which they are to be used, according to the size of the coupling member.

We claim as our invention:

1. Two conduit coupling rods, each rod having at both its ends a coupling socket, each socket being symmetrical to the others, locking means on each socket adapted for engagement with locking means on another socket, and a single wheel carried on each socket whereby a pair of wheels will be produced when adjoining sockets are secured together.

2. A coupling rod having a coupling socket at each end, each coupling socket being provided with locking means, and a single wheel carried at each end of said rod, one on each socket.

3. A coupling rod having a socket at each end comprising in part a projecting piece having a slabbed outer side, and a wheel journaled in said side, and occupying a recess formed by the slabbed side.

4. A pair of duplicate coöperating coupling members, each provided with duplicate coupling surfaces, and a guide wheel carried by each coupling member, two duplicate coupling members coöperating to form a coupling provided with a pair of coöperating guide wheels.

5. A coupling member comprising a sleeve cut away at one side thereof, a wheel attached to said member at the outer side of said cut away portion, and a stud or pin securing said wheel to the cut away portion of said member and upset on the inner side of said cut away portion.

6. A coupling member comprising a sleeve cut away at one side thereof and slabbed off at the opposite side thereof, a wheel secured to the slabbed off side of said coupling member, and a headed pin for securing said wheel to said slabbed off side of the coupling member, said pin having its inner end upset on the inner side of said cut away portion.

Signed at 9 to 15 Murray street, in the borough of Manhattan, county, city and State of New York, this 3rd day of September, 1908.

EDWIN L. UPSON.
FREDERICK J. DOLE.

Witnesses:
C. A. WEED,
H. D. PENNEY.